Jan. 19, 1943.     C. M. EASON     2,308,681

CLUTCH

Filed Nov. 13, 1939     5 Sheets-Sheet 1

Inventor:
Clarence M. Eason
By Brown, Jackson, Boettcher & Dienner
Attys.

Jan. 19, 1943.　　　　C. M. EASON　　　　2,308,681
CLUTCH
Filed Nov. 13, 1939　　　　5 Sheets-Sheet 2

Inventor:
Clarence M. Eason
By Brown, Jackson, Boettcher & Dienner
Attys.

Jan. 19, 1943.    C. M. EASON    2,308,681
CLUTCH
Filed Nov. 13, 1939    5 Sheets-Sheet 4

Fig. 8.

Inventor:
Clarence M. Eason
By Brown, Jackson, Boettcher & Dienner
Attys.

Jan. 19, 1943.  C. M. EASON  2,308,681
CLUTCH
Filed Nov. 13, 1939  5 Sheets-Sheet 5

Inventor
Clarence M. Eason
By Brown, Jackson, Boettcher & Dienner,
Attys.

Patented Jan. 19, 1943

2,308,681

UNITED STATES PATENT OFFICE 2,308,681

CLUTCH

Clarence M. Eason, Waukesha, Wis.

Application November 13, 1939, Serial No. 304,003

26 Claims. (Cl. 192—55)

The present invention relates generally to clutches, and is concerned primarily with the problem of preventing the transmission of overload torque through various types of clutches in various situations.

The problem arises particularly in friction clutches having torque responsive servo mechanism provided for the purpose of securing a relatively high pressure of engagement between the friction elements of the clutch. In my co-pending application Serial No. 185,679, filed January 19, 1938, and issued as Patent No. 2,268,578 on Jan. 6, 1942, I have disclosed a punch press clutch having torque responsive servo mechanism of the helical spline type for securing high pressure engagement of the clutch. In my copending application, Serial No. 279,899, filed June 19, 1939, I have disclosed another friction clutch having torque responsive servo mechanism of the toggle strut type for securing high pressure engagement of the clutch. In these servo types of friction clutches, the pressure of engagement between the clutch surfaces can be carried up to the point where the clutch is slipless under any torque. This is frequently objectionable because of the likelihood of breakage of the clutch or of the machine driven thereby under accidental or high overload torques. The present invention is concerned particularly with the provision of improved means for permitting slippage of the clutch under such conditions.

A typical illustration showing the desirability of this overload slip or overload release is exemplified in the case of a punch press which it is desired to operate over a relatively wide range of speeds. When such a press is to perform a drawing operation, or some operation where there is to be a displacement of the metal without complete punching or shearing, a relatively low speed is desirable. This speed may be in the neighborhood of 75 to 100 revolutions per minute. If the press capacity is twenty-five tons at 75 to 100 revolutions per minute, it will be understood that the fly-wheel of the press must be of sufficient mass to perform the twenty-five ton operations at this speed. Assume now that it is desired to put this press to other duties, such as punching operations in conjunction with an automatic feeder, where high speed is desirable for performing the punching or shearing operation and is also desirable for economic reasons. It may then be advantageous to speed this same press up to as high as 500 or 600 revolutions per minute. However, since the kinetic energy of the flywheel increases as the square of the speed, it will be seen that a tremendous kinetic energy will be stored in this flywheel at such higher speeds. If the feeding apparatus should fail to function properly, or if some other condition should develop where the die cannot cut through the work, the large energy stored in the flywheel is almost certain to cause very destructive damage to the punch press or clutch unless the overload torque is released. The friction type of clutch lends itself much more readily to these higher operating speeds than the conventional jaw or pin clutch, and the need for such overload release therefore arises more frequently in the case of friction clutches. My improved overload release feature is not limited to this specific situation, however, but is of distinct advantage in a wide variety of situations where there may not be much variation of speed, kinetic energy etc., but where it is desirable to have the clutch capable of yielding or slipping at a substantially predetermined overload torque. In this regard, one of the additional features of the invention is the adjusting arrangement which accommodates adjustment of the point of slippage, i. e., adjustment of the predetermined overload torque at which it is desired to have the clutch yield.

Numerous other features, objects and advantages of the invention will appear from the following detail description of certain preferred embodiments thereof. In the accompanying drawings illustrating such embodiments.

Each of the embodiments herein disclosed employ torque responsive servo mechanism of the toggle strut type such as is disclosed in my aforementioned copending application Serial No. 279,899, and attention is directed to that application for the details of this servo mechanism.

Figures 1, 2:
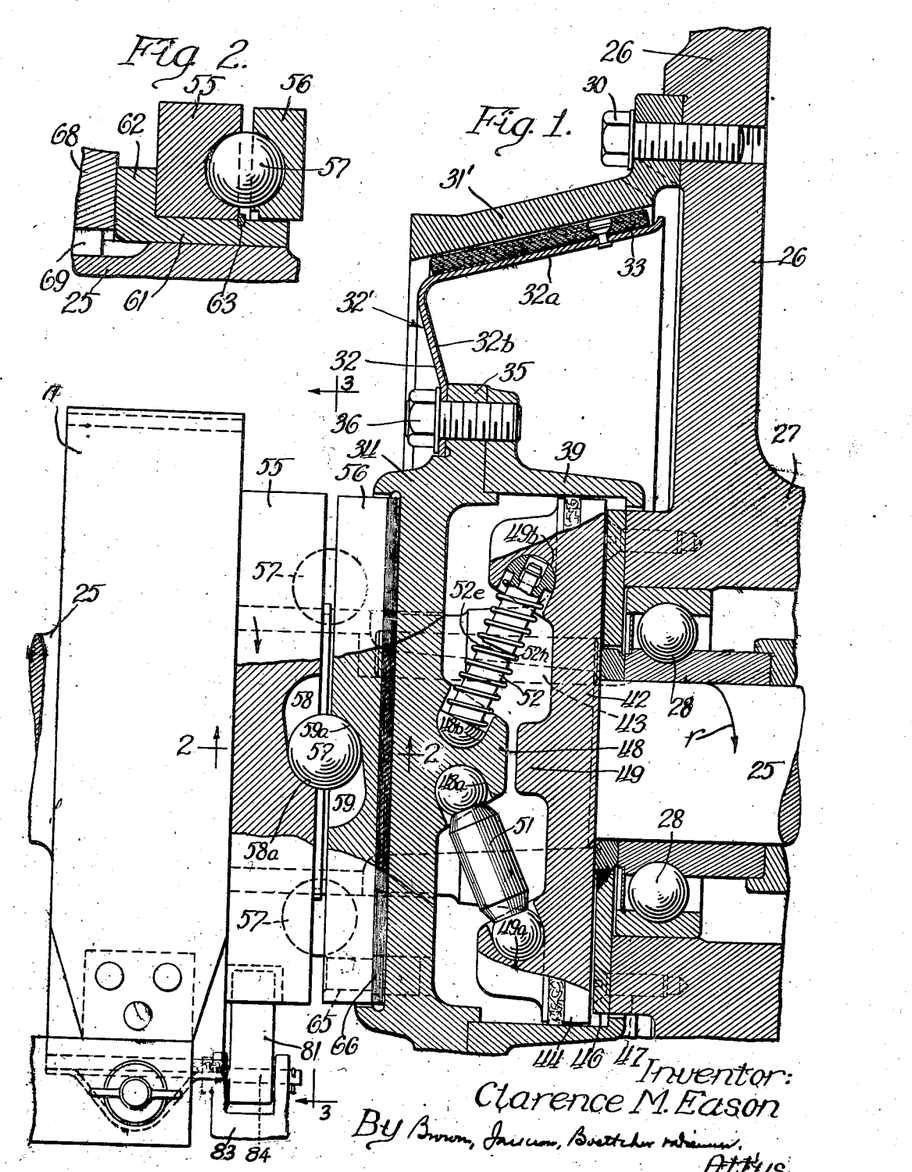
Figure 1 is a fragmentary longitudinal view, partly in axial section, partly in offset section, and partly in elevation, showing one embodiment of my improved overload release clutch.
Figure 2 is a fragmentary detail section taken approximately on the plane of the line 2—2 of Figure 1.

Referring now to the embodiment illustrated in Figure 1, I have, by way of example, shown my improved clutch in use on a punch press, although it will be understood that the invention is not necessarily limited to that use. The crank shaft of the punch press is indicated at 25, and the web portion of the flywheel, bull-gear or other driving element is indicated at 26. The hub portion 27 of said flywheel is journaled on the reduced outer end of the crank shaft 25 through the medium of thrust resisting antifriction bearings 28. The driving element of the clutch consists of a female cone 31' which is bolted to the web portion by the cap screws 30. The driven element of the clutch comprises a coacting male cone 32a, this being shiftable axially for effecting clutch engagement with the nonshiftable driving cone 31'. The cone 32a constitutes the outer portion of a formed sheet metal member 32 having an inwardly extending web portion 32b. This sheet metal member 32 is one part of an assembly which makes up the shiftable clutch element, and which I have designated 32' in its entirety. A renewable clutch lining 33 is secured to one of the clutch elements, preferably to the shiftable driven element 32'. The shiftable clutch element also comprises a central hub structure 34 having a radially extending flange 35 to which is secured the web portion 32b of the sheet metal cone 32 by the cap screws 36 passing through the web portion of said cone and through said flange. The hub structure 34 includes an axially extending member 39 which circumferentially encloses the toggle strut servo mechanism.

Embraced within the hub structure 34 and member 39 is the thrust reaction member 42 which receives the thrust reaction of the toggle struts and establishes the torque transmitting connection between the shiftable clutch element and the crank shaft 25. This member 42 is rigidly anchored to the shaft 25 by a drive key 43 and by a tight fit on a tapered portion of said shaft, although it will be understood that a splined connection may be employed in lieu thereof, if desired. The radially extending flange 44 at the outer end of the member 42 abuts against a thrust ring 46 which is secured to the hub 27 of the driving element 26 by the screws 47. Thus, the thrust reaction incident to the axial movement of the shiftable clutch element 32' into engagement with the non-shiftable clutch element 31' is transmitted back through the thrust plate 46 and through the hub 27 and the web of the driving element 26 to the non-shiftable clutch element 31'. The forces set up in the operation of releasing the clutch are transmitted through the thrust plate 46, hub 27 and thrust bearing 28 to the shaft 25. As remarked above, the strut type of servo mechanism is illustrated in complete detail in my copending application Serial No. 279,899 and, accordingly, I have made only a schematic illustration thereof in the present drawings. Briefly describing this servo apparatus, it will be seen that the shiftable hub 34 is formed with a plurality of lugs or bosses 48 which project laterally toward the right, and that the thrust reaction member 42 is formed with a plurality of lugs or bosses 49 which project laterally toward the left, the lugs or bosses of one member alternating or extending into the spaces between the lugs or bosses of the other member around the peripheries of these members. Interposed between these alternating bosses are the driving toggle struts 51 and the spring toggle struts 52. The driving struts 51 are solid, fixed-length steel units somewhat resembling dumbbells, the spherical end heads being relatively large and being accurately machined and ground for sustaining high compressive thrust loads through said end heads with minimum friction. These spherical end heads engage respectively within the spherical sockets 48a and 49a formed, respectively, within the boss 48 and the boss 49. These sockets are accurately machined and ground, and are preferably of a slightly larger radius than the ball ends of the struts. The reverse driving, spring toggle struts 52 each comprise the two separate shank portions having semi-spherical heads at their outer ends. The two strut sections are both slidable along an axial pin 52e, the ends of which carry suitable stop rings which have snap engagement within annular grooves formed in the axial pin. These stop rings play within outer counterbores in the two strut sections, thereby limiting outward extensibility of the struts. A relatively heavy compression spring 52h encircles the struts and has its ends abutting the annular shoulders defined by the undersides of the semi-spherical end heads. The latter end heads have rockably bearing mounting within the spherical sockets 48b and 49b which are accurately machined and ground within the bosses 48 and 49, respectively.

There are preferably three pairs of such driving and spring struts 51 and 52 spaced equidistantly about the periphery of the shiftable clutch member 32' and thrust reaction member 42. Of course, any desired number of pairs may be employed, but three pairs afford a three-point application of the spring pressure and also of the servo pressure. In this regard, my invention contemplates either a construction in which the shifting and rotating movement of the shiftable clutch member 32', incident to clutch engagement and release, occurs on a bearing surface afforded by the hub of the thrust reaction member 42, or other equivalent bearing surface, or, in the alternative, where this shifting and rotating movement occurs as a floating motion on the struts so that rocking, tilting, radial displacement or a veritable universal joint action is permitted for enabling most effective coaction between the driving and driven cones.

The helical angle of each strut is an angular relation of the strut with respect to the axial line of the clutch. The forward driving struts 51 are all inclined at the same common angle with respect to this axial line, and the reverse driving struts 52 are all reversely or oppositely inclined at the same common angle with respect to this axial line. In the embodiment illustrated, this angular inclination is of substantially the same degree for both sets of struts, although the two sets may be disposed at considerably different angles, if desired. The degree of engaging pressure ultimately established in the clutch by the servo action of the struts can be proportioned as desired by varying the angular inclination of these struts. For example, as the angle of inclination of the struts 51 is made to approach the plane of rotation the servo action diminishes, and as the angle of inclination is made to approach the axial plane the servo action increases.

With reference to the spring struts 52, the springs on these struts function as the loading springs which normally tend to force the shiftable clutch element 32' into engagement with the non-shiftable clutch element 31'. It will be observed that by virtue of their inclined positions, these spring struts impart an axial component and a rotating component to the shiftable clutch element. The axial component is further supplemented by the toggle action of the driving struts 51. The normal direction of rotation of the clutch and crank shaft is indicated by the arrow r. It will be noted that the spring struts tend to produce relative rotation between the driven clutch element 32' and the thrust reaction member 42 in opposite directions, i. e. they tend to rotate the driven clutch element in the forward direction of rotation r and, at the same time tend to rotate the thrust reaction member 42 and the connected crank shaft 25 in the reverse direction of rotation. These compression springs on the spring struts 52 are placed in a loaded or cocked condition by the inertia of the crank shaft and its connected parts when the clutch is disengaged, so that these springs normally stand ready to effect engagement of the clutch instantly upon the tripping operation. As described in my aforementioned copending application, these spring struts can also function as reverse drive struts. It is frequently desirable to be able to back up the press ram during the operation of changing or setting the dies, or to free the movable die from a jammed condition in the work, and such can be readily accomplished, in my improved construction, by the action of the spring struts 52 contracting to a solid condition when the relative rotation between the clutch member 32' and thrust reaction member 42 is in a direction tending to compress each strut 52.

Various types of clutch control mechanism may be employed but I preferably utilize a ball-cam type of mechanism such as I have disclosed in my aforementioned copending application Serial No. 279,899, or such as I have disclosed in my copending application Serial No. 282,588, filed July 3, 1939. This mechanism is mounted on the crank shaft 25 at a point between the frame of the press and the above described clutch structure, said mechanism comprising two circular cam plates or clutch actuators 55 and 56 between which are disposed balls 57. As shown in Figures 1 and 2, the opposing faces of the two cam plates are formed with coacting runways 58 and 59 for each of the balls 57. The two cam plates or clutch actuators 55, 56 are capable of relative rotation, and such relative rotation occurring in one direction operates through the balls and sloping runways 58, 59 to create a spreading or separating pressure between the cam rings for holding the shiftable clutch element 32' in its disengaged position. The cam ring 55 is capable of rotary movement but is fixed against axial shifting movement, whereas the cam ring 56 is capable of both rotary and shifting movement. As shown in Figure 2, the non-shiftable thrust ring 55 is mounted on a sleeve 61 which has an inner radial flange 62 against which the ring 55 is adapted to have thrust reaction. A snap type of confining ring 63 snaps into an annular groove in the sleeve 61 at the outer side of the cam ring 55 and prevents outward displacement of the cam ring. Said cam ring can have its motion interrupted without stopping continued forward rotation of the crank shaft 25, such being accommodated by the ability of the crank shaft to rotate within the sleeve 61, or the ability of the sleeve 61 to rotate within the cam ring 55, or both.

The shiftable cam ring 56 has pinned connection with the shiftable clutch element 32' through the dowel pins 65, thereby compelling a concurrent angular movement between the shiftable clutch element and the shiftable cam ring. A plurality of spacing shims 66 are interposed between the outer face of the cam ring 56 and the adjacent inner face of the shiftable hub structure 34, whereby the addition or removal of these shims effects a spacing adjustment for predetermining the overload torque at which slippage of the clutch is to occur, and also for taking up wear of the clutch lining 33.

Also mounted on the crank shaft 25 is the brake drum 68, the latter being rigidly secured to the shaft, as by the key 69. A brake or snubbing band 71 encircles this brake drum, the band having any suitable brake lining material 72 for engaging the drum. One end 73 of the brake band is rigidly anchored to any suitable fixed point of attachment 74, and the other end 75 of the band has a continuous spring tension acting thereon, through the medium of a plunger rod 76 on which a compression spring 77 acts, this plunger rod exerting a continuous tension tending to draw the band tightly about the drum. Such tension may be adjusted by rotation of a wing nut 78. The ends 73, 75 of the brake band are so related to the normal forward direction of rotation that motion in this direction tends to release the snubbing or braking action of the band, but motion in the reverse direction immediately receives the full force of the snubbing action for preventing such motion. This brake mechanism 68—71 is conventional apparatus in intermittently operated punch presses, and may be mounted on the opposite end of the crank shaft 25, instead of at the clutch end as shown. The actual control of the clutch through the ball-cam mechanism 55—57 is effected by the operation of the releasable stop arm or sprag indicated at 81 in Figure 3. This stop member has any firmly supported pivotal mounting at its outer end, and is actuated vertically through the control yoke or link 83 which is pivotally connected to the stop member 81 by the pin 84. The nose 81' of this releasable stop is adapted to abut against a right-angle stop shoulder 85 which is formed in the non-shiftable cam plate 55. A gradual track or slope 86 leads inwardly from the periphery of the cam plate 55 to the bottom end of the stop shoulder 85.

Figure 3:
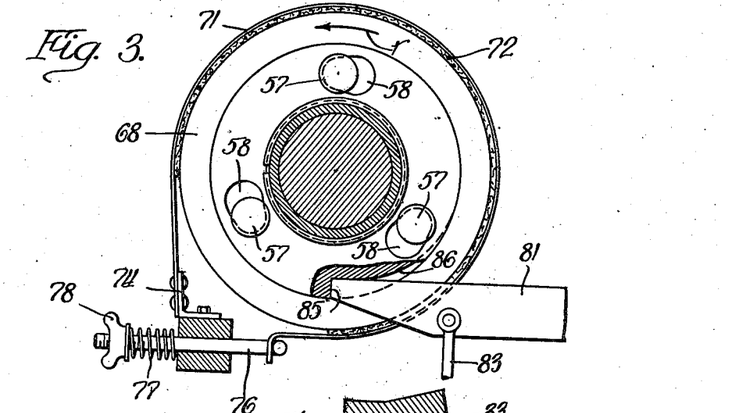
Figure 3 is a transverse sectional view of the brake and control apparatus, taken approximately on the plane of the line 3—3 of Figure 1.

In the normal disengaged condition of the clutch, the tripping mechanism 81—85 is in the position illustrated in Figure 3, and the ball-cam mechanism 55—57 and strut mechanism 51—52 are approximately in the positions illustrated in Figure 1. In such condition of the strut mechanism, the three spring struts 52 all exert a spring pressure on the shiftable clutch element 32' tending to rotate it in the normal forward direction of rotation of the continuously rotating driving clutch element 31'. This spring pressure also reacts through the driving struts 51 so as to tend to shift the shiftable clutch element toward the left into engaging position.

This rotating shifting force thus continuously exerted by the spring struts on the shiftable clutch element is imparted directly to the shiftable cam ring 56, tending to move this cam ring axially and to the left, as illustrated in Figure 1. This holds the shallow end of each cam runway 59 pressed up against the back of each associated ball 57, as shown in the latter figure. Correspondingly, the front side of each ball is held up against the shallow end of each cam runway 58 in the non-shiftable cam ring 55. The engagement of each ball in the shallow ends of both cam pockets or runways 58—59 necessarily results in the maximum degree of separation or spread between the two rings 55—56, this corresponding to the released condition of the shiftable clutch element 32'. At this time, the engagement of the tripping stop 81 against the shoulder 85 of ring 55 prevents the latter ring from running ahead under the action of the rotating and axially shifting forces exerted through the balls 57. At this same time, the brake mechanism 68—71 is also preventing the reaction pressure of the spring struts 52 from causing the thrust reaction member 42 and crank shaft 25 to revolve in a reverse direction and thereby effect engagement of the clutch.

Upon tripping the stop arm 81 out of engagement with the shoulder 85, the cam ring 55 is free to advance in the forward direction of clutch rotation, indicated by the arrow r in Figure 3. This cam ring is normally impelled in this direction by the above described action of the balls 57 exerting a rotative force and a camming force against the bottoms of the cam pockets 58. Hence, the immediate angular shift of the cam ring 55 permits the balls 57 to run toward or into the deep ends of the pockets or runways 58—59, thereby permitting the shiftable cam ring 56 to move axially toward the non-shiftable cam ring 55. This permits the axial displacement of the shiftable clutch element 32' into engagement with the continuously rotating driving clutch element 31' under the action of the spring struts 52. The engagement of the clutch surfaces results in the entire torque load being transmitted through the forward driving struts 51, thereby causing these struts to act with a toggle servo motion for forcing the shiftable clutch element into engagement with the driving clutch element under extremely high engaging pressures.

Figure 4:
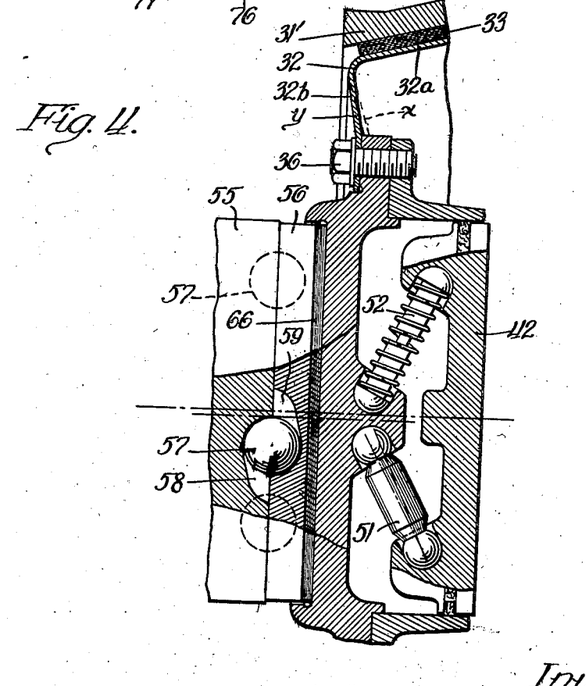
Figure 4 is a schematic view on a smaller scale showing the relation of the parts when the clutch is engaged.

If the parts are so proportioned and adjusted that the servo mechanism continues to create an axial shifting force, after the clutch surfaces have been brought together, with a pressure in excess of that necessary to carry the normal torque load, and furthermore, if there is no point of yield in the train of parts being subjected to this axial shifting force, it follows that the clutch will lock itself up in a slipless engagement which will wreck the punch press or the clutch parts before overload slippage will occur. However, in the above described embodiment of my invention, I construct the sheet metal cone member 32 to provide a yielding point in the train of parts which are subjected to the servo shifting force, and I also construct and arrange the control mechanism 55—57 and related parts so that after a predetermined range of clutch engaging movement has been given to the inner peripheral portion of this yieldable cone 32, the shiftable cam ring 56 comes into direct face-to-face abutment against the non-shiftable cam ring 55. Such abutment between these two cam rings positively limits or stops the transmission of further shifting movement from the servo-mechanism to the yieldable cone 32. The action may be likened to that of "bottoming" or "short-circuiting" the servo mechanism, this condition of the parts being illustrated in Figure 4. As shown therein, when the two cam rings 55—56 are bottomed or go solid by having their adjacent faces come into contact with each other, all further thrusting movement or force of the toggle strut servo mechanism is short-circuited from the cam ring 55 back through the crank shaft 25 to the thrust reaction member 42. Thus, a predetermined degree of axial shifting movement is imparted to the inner bolted periphery of the sheet metal cone 32, up to the point where the limiting stop is established by the ring 56 abutting face-wise against the ring 55, following which further action of the toggle strut servo mechanism is rendered non-effective or is nullified. Figure 4 illustrates two positions of the inner web portion 32b of the sheet metal cone 32, a dotted line position $x$ to the right, and a full line position $y$ to the left, the space between these positions being slightly exaggerated for clarity of illustration. The dotted line position $x$ is intended to represent the position of the web portion when the two clutch surfaces come into driving engagement. The full line position $y$ is intended to indicate the flexure or degree of spring loading imposed on the sheet metal cone 32 up to the point where the servo mechanism encounters its limiting stop and ceases to be further effective. This spring loading imposed on the sheet metal cone 32 is precalculated to sustain all average or normal torque loads imposed on the clutch, but not to be able to sustain abnormally high or destructive torque loads imposed on the clutch. That is to say, under the latter loads the clutch will slip. Whenever it is desired to adjust the slippage point of the clutch for adapting it to higher or lower normal torques, such is accomplished by removing or adding spacing shims 66 between the shiftable hub structure 34 and the cam ring 56. The removal of these shims increases the range of movement of the shiftable hub structure before the ball-cam mechanism goes solid, and hence increases the spring loading imposed on the shiftable clutch element. The addition of spacing shims serves to reverse function of reducing the range of shifting movement of the hub structure before the ball-cam mechanism goes solid, thereby reducing the spring loading on the shiftable clutch element. As wear of the clutch lining 33 occurs, such wear can also be taken up by the removal of spacing shims 66. My improved toggle strut servo mechanism automatically adapts itself to the various adjustments made by the removal or addition of these shims. The sheet metal cone 32 on which the spring loading is imposed is preferably constructed of an appropriate steel or appropriate alloy, and may be constructed by spinning, drawing or in any other preferred manner. If desired, certain of the teachings of my prior Patent No. 2,127,720 may be followed in the construction of this cone, particularly if it is desired to have the flaring outer conical portion 32a of segmental construction for added resiliency.

The rotation of the crank shaft 25, which was thus initiated by the engagement of the clutch, continues until the stop arm or dog 81 (Figure 3) is restored to position where it will be engaged by the shoulder 85 of cam ring 55. If the punch press is to operate continuously, the stop arm 81 is held down in its lower position, out of the path of said shoulder. On the other hand, if the punch press is to have an intermittent or one-cycle stop motion, the stop arm is released immediately after tripping so that this arm resumes contact with the periphery of the cam ring 55, whereby said shoulder 85 comes into abutment with said stop arm after the completion of one revolution of the crank shaft 25. Upon the abrupt stopping of the cam ring 55, coacting shiftable cam ring 56 carries on ahead and thereby causes the balls 57 to be rolled up into the shallow ends of both coacting cam pockets 58, 59 finally coming into engagement with the relatively abrupt end shoulders or end stops 58a—59a. The resulting spreading force between the two cam rings thrusts the shiftable clutch element 32' back to its original disengaged position, this driven clutch element and the crank shaft coming to a relatively quick stop under the action of the continuously dragging brake band 71. This corresponds to a restored condition of the parts, in the same relation that they occupied at the start of the cycle.

Figures 5, 6, 7:
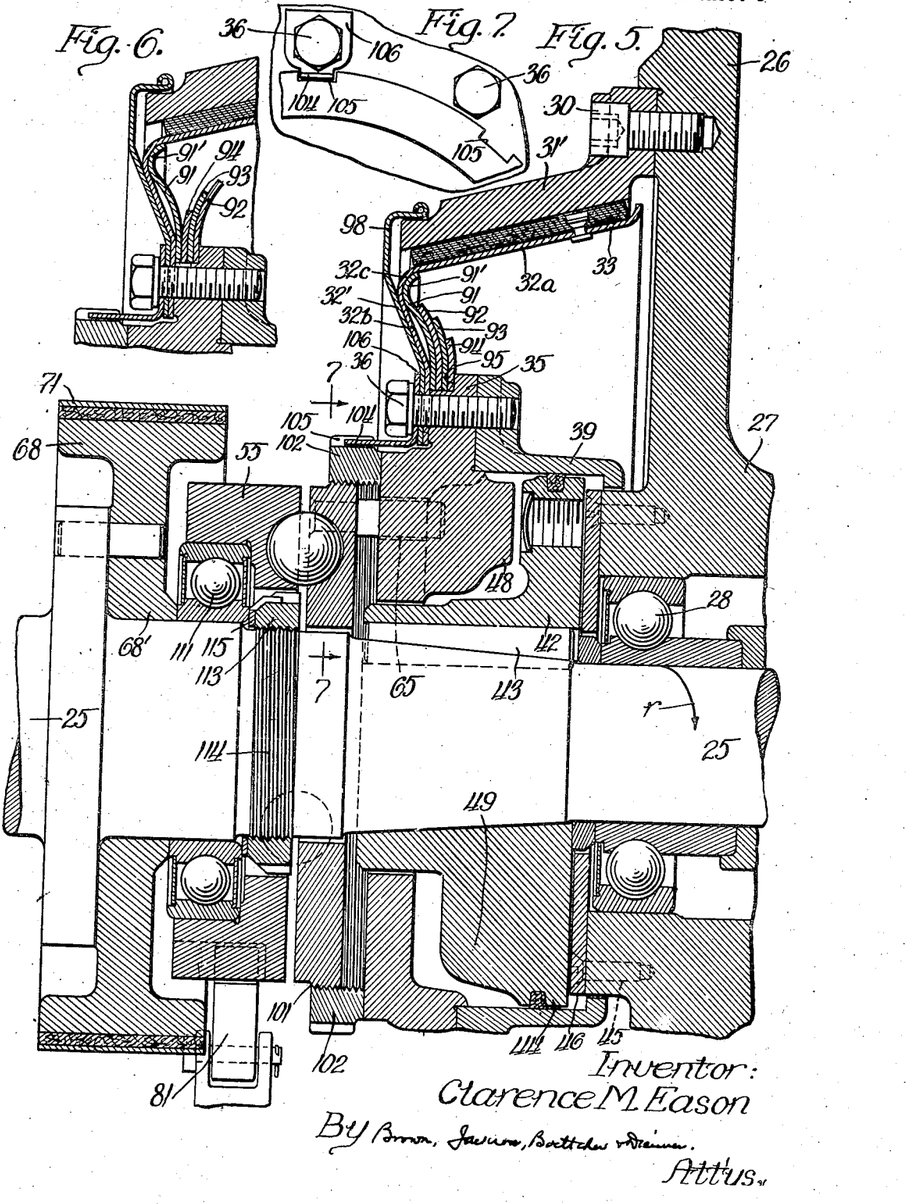
Figure 5 is an axial sectional view through another embodiment of my improved clutch.
Figure 6 is a detail sectional view showing some of the spring elements of the latter embodiment reversed or transposed to non-effective positions.
Figure 7 is a fragmentary detail view of one of the adjusting means, corresponding to a view taken on the plane of the line 7—7 of Figure 5.

In the construction illustrated in Figures 5, 6, and 7 I show a further development of the invention wherein I use a plurality of spring steel washers 91, 92, 93, 94, to serve as resilient backing elements for backing up the web portion 32b of the resilient clutch cone 32. All of these washers are dished or curved in such manner that they can be nested as shown in Figure 5. The larger disk or washer 91 has a reversely curved bead 91' in its outer periphery for nesting within the rounded curve 32c of the cone element. The inner peripheries of these disks are all removably seated in an annular groove 95 formed in the flange 35 of the shiftable clutch element, being clamped therein by the tension of the cap screws 36 acting through the cone web 32b. When the disks are all assembled in the relation illustrated in Figure 5 their spring tensions are all accumulative for placing a maximum degree of resilient stiffness against the back of the clutch zone. In this adjustment of the construction the clutch will transmit a relatively high torque load before overload slippage will occur. If it is desired to reduce the slippage level to a lower part of the torque curve, such can be readily accomplished by releasing the spring disks 91—94 and reversing the position of one or more of the disks in the assembly. In Figure 6 I have shown the three smaller disks 92, 93 and 94 turned about in the assembly so that their resiliency is no longer effective on the clutch cone, but, instead, the inner portions of said disks merely function as spacers for mounting the large spring disk 91. Intermediate points of slippage can be obtained by reversing only one or two of these spring disks. If desired, a sheet metal guard ring 98 may be secured to the shiftable clutch element 32' and arranged to overlie the outer clutch element 31' so as to prevent the entrance of lubricant and foreign matter to the clutch surfaces.

In this construction I have illustrated a modified form of adjusting means which enables the cam ring 56 to be adjusted toward or away from the shiftable clutch element with greater ease and facility than by removing or adding shims 66, as described of the preceding embodiment. In this modified construction, the cam ring 56 is provided with an external thread 101 over which screws an adjusting ring 102. This ring abuts against the adjacent surface of the shiftable hub structure 34, and by rotating said ring relatively to the cam ring 56 said cam ring can be shifted inwardly or outwardly relatively to the hub structure 34. In such rotative adjustment of the ring 102, the cam ring 56 is held against corresponding rotative movement by the dowel pins 65. The adjusting ring is locked in any adjusted position by the engagement of the lug or finger 104 in any one of a series of notches 105 formed at equally spaced points around the outer periphery of the ring. Said locking finger 104 projects from an apertured plate 106 adapted to engage under the head of any one of the cap screws 36 which secure the yieldable clutch cone to the hub structure 34. Referring to Figure 7, the notches 105 in the locking ring have a different angular spacing than the cap screws 36 so as to enable a vernier adjustment to be obtained in the rotative position of the adjusting ring relatively to the hub structure. For example, there may be twelve cap screws 36 in the hub structure and only ten notches 105 in the adjusting nut 102. Hence, if it is desired to adjust the nut 102 through a smaller range of motion than the angular distance between successive notches 105 then the locking member 105—106 can be removed from engagement under one cap screw 36 and shifted for mounting under another cap screw, whereby extremely small adjustments of the limiting stop may be made.

In this modified construction, I also show the cam ring 55 as mounted on an anti-friction thrust bearing 111. The inner race of said bearing is mounted directly on the crank shaft 25 and abuts against the hub 68' of the brake drum 68. The provision of this thrust bearing reduces the friction which the cam ring 55 must overcome when it is caused to run forwardly upon the tripping of the stop dog 81. In this same regard, it may be desirable to provide a special stop ring 113 for receiving the endwise abutment pressure of the cam ring 56, instead of having this abutment pressure transmitted through the other cam ring 55 to the anti-friction thrust bearing 111. Said special stop ring 113 screws over a thread 114 on the shaft 25. A lock washer 115 has suitable extension means which is engageable in peripheral notches in the ring 113 for holding the latter in different positions of adjustment on the thread 114. In such embodiment of the invention, the shifting movement of the cam ring 56 under the force of the servo mechanism is brought to a stop by the engagement of said cam ring 56 against the adjacent face of the stop ring 113. The operation of engaging and releasing this embodiment of clutch is substantially the same as described of the preceding embodiment.

Figure 8:
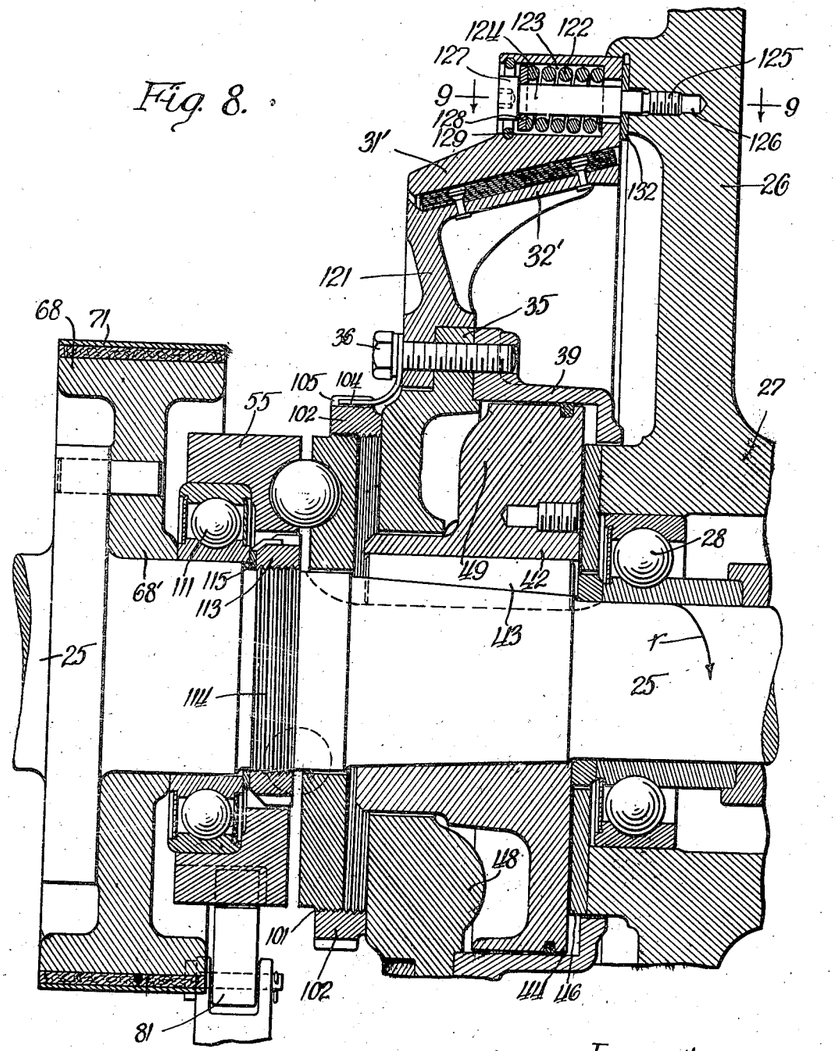
Figure 8 is an axial sectional view illustrating a third embodiment of my improved overload release clutch.
Figure 9:
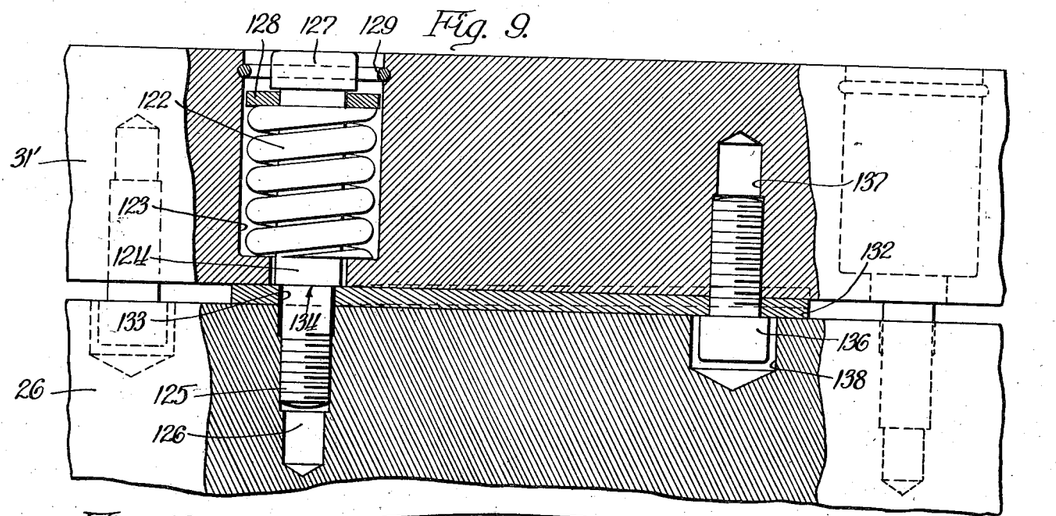
Figure 9 is a sectional view on a larger scale through one of the torque transmitting straps corresponding to a section on the line 9—9 of Figure 8.
Figure 10:
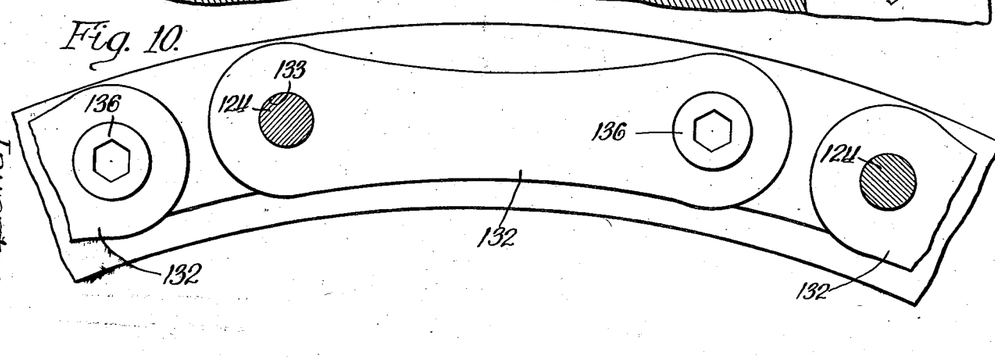
Figure 10 is a front elevational view of one of these torque transmitting straps.

In the modified construction shown in Figures 8, 9, and 10, the point of yield has been transferred from the web structure of the inner cone 32' to the mounting of the outer cone 31'. In this modified embodiment, the inner cone 32' is formed as a part of an aluminum casting 121 or the like so that this cone and its web structure is a relatively rigid unit. The outer cone 31' is yieldingly mounted so as to be capable of lateral shifting movement under the action of predetermined servo pressures set up between the clutch surfaces, this shifting movement being against the action of a series of compression springs 122 disposed at spaced points around the outer periphery of the outer cone. Each spring is housed within a cylindrical pocket 123 cored out in the outer portion of the cone ring. Extending centrally through each spring and pocket is a stud 124 having a reduced threaded shank 125 at its inner end which screws into a tapped bore 126 in the web 26 of the bull-gear, flywheel or the like. A head 127 at the outer end of the stud 124 supports a washer 128 against which the outer end of the spring 122 bears, the inner end of said spring abutting against the bottom of the pocket 123. A removable snap ring 129 fits into an internal annular groove formed in the outer end of each cylindrical pocket 123. This ring serves to retain the compression spring 122 confined within the pocket 123 whenever the stud 124 is not in place within the pocket, as for example, in assembling and disassembling operations. When each stud 124 is screwed home into its proper position in the assembly it imposes a definite compression pressure upon its respective spring 122. This pressure can be adjusted by employing a system of interchangeable or additional washers 128. For example, the use of thicker or thinner washers, or the use of one washer or a plurality of washers, enables various pressures to be established in each spring 122. The effect of the aggregate spring pressure is to hold the outer clutch cone 31' pressed toward the bull-gear web 26 with a relatively heavy pressure.

If desired, the inward and outward shifting movement of the outer cone 31' may be guided solely by the studs 124, as by arranging the apertured inner ends of the pockets 123 to have a relatively accurate guided fit over the shank portions of the studs. In such arrangement, the entire torque would, of course, have to be carried by these studs. As an alternative arrangement, the drive may be carried by a plurality of torque straps 132 which are yieldably connected between the bull-gear web 26 and the shiftable cone 31'. These straps are illustrated to better advantage in Figures 9 and 10, and preferably consist of relatively thin spring steel link elements occurring in close succession between the adjacent surfaces of the web 26 and cone 31'. One of such straps is associated with each spring stud 124, the reduced threaded end 125 of the stud passing through a closely fitting hole 133 in the strap. The annular shoulder 134 which is formed between the body of the stud and its reduced threaded end is brought to bear against the outer side of the strap 132 under the heavy clamping pressure resulting from screwing these studs up tight against the straps. Such firmly attaches one end of each strap to the bull-gear web 26, this end of the strap being the forward end with respect to the direction of rotation so that the driving torque always acts as a tension within the strap. The trailing end of each strap is anchored to the shiftable cone 31' by a cap screw 136 which passes through an aperture in the trailing end of the strap and threads into a tapped hole 137 in the outer peripheral portion of the shiftable cone. The head of each cap screw 136 is accommodated in a hole 138 formed in the adjacent face of the bull-gear web 26. The lateral flexibility of the series of torque straps 132 accommodates inward and outward shifting movement of the driving cone 31' without the objectionable friction usually found in sliding guide surfaces, and without wear of contacting parts. The dotted line position of the strap 132 in Figure 9 illustrates a typical range of flexure of these torque straps, only a small degree of flexure being adequate to permit the overload slippage relation of the clutch cone 31'.

This embodiment is shown as being provided with the same arrangement of ball-cam mechanism 55—57 and adjusting ring 102 as described of the preceding embodiment. In each of the embodiments herein described, variations in the point of overload slippage may be made by adjusting the stop relation which limits the servo action, or by adjusting the spring pressure which makes the clutch engaging pressure yieldable, or by making adjustments in both of these. The two embodiments illustrated in Figures 5 and 8 preferably have the same form of toggle strut servo mechanism which was previously described in connection with Figure 1. The invention has its greatest field of utility in connection with friction clutches having such toggle strut type of servo mechanism, but it will be understood that the invention can also be embodied in clutches having other types of servo mechanism, for example, of the type shown in my copending application Serial No. 185,679 issued as Patent No. 2,268,578. Furthermore, the invention can also be embodied in clutches having other forms of control mechanism, for example, of the constructions shown in my copending application Serial No. 282,588.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a clutch, the combination of cooperating clutch elements, one of said clutch elements being shiftable into and out of driving engagement with the other clutch element, servo mechanism connected in series with said clutch elements for transmitting operating energy to one of said clutch elements, and means for preventing said servo mechanism transmitting such operating energy in excess of a predetermined maximum so as to avoid the transmission of an overload torque through said clutch.

2. In a clutch, the combination of cooperating driving and driven friction clutch elements, toggle strut servo mechanism connected between said driven clutch element and the load for securing high pressure engagement between said clutch elements, and means for limiting the engaging pressure effective between said clutch elements to prevent the transmission of overload torque through said clutch.

3. In a clutch, the combination of cooperating clutch elements for transmitting rotary motion from a source of power to a load, servo mechanism for transmitting operating energy to one of said clutch elements, and means for positively short-circuiting further action of said servo mechanism after a substantially maximum predetermined engaging pressure has been established between said clutch elements and while said maximum predetermined pressure is being maintained.

4. In a cone clutch, the combination of cooperating friction clutch cones, one of which is shiftable, manually controlled means for effecting initial engagement of said cones, torque responsive servo mechanism thereafter operative to transmit a relatively high pressure shifting force to said shiftable cone for securing high pressure engagement between said cones, and stop means for nullifying further action of said servo mechanism after a substantially predetermined engaging pressure has been established between said clutch cones.

5. In a clutch, the combination of cooperating clutch elements, servo mechanism for transmitting engaging pressure to said clutch elements, yieldable means through which said engaging pressure is made yielding, and means for restricting the effective range of movement of said servo mechanism in such relation to the effective range of movement of said yieldable means as to prevent the transmission of overload torque through the clutch.

6. In a clutch of the class described, the combination of cooperating conical friction clutch elements, one of which is shiftable, torque responsive servo mechanism for transmitting shifting movement to said shiftable clutch element for establishing relatively high engaging pressure between said clutch elements, resilient means through which said engaging pressure is made yielding, and means for preventing the effective movement of said servo mechanism from deflecting said resilient means beyond a predetermined pressure.

7. In a friction clutch, the combination of cooperating friction clutch elements, one of which is shiftable, torque responsive servo mechanism for transmitting a shifting force to the shiftable clutch element in a clutch engaging direction, yieldable means through which said shifting force is transmitted to said shiftable clutch element, and stop means for limiting the range of shifting movement of said servo mechanism, said yieldable means and said stop means cooperating to prevent said servo mechanism from transmitting overload torque through the clutch.

8. In a friction clutch, the combination of cooperating friction clutch elements, one of which is shiftable, toggle strut servo mechanism sustaining substantially the entire torque load of the clutch and responsive thereto for transmitting a shifting force to said shiftable clutch element in a clutch engaging direction, and yieldable means responsive to said shifting force and adapted to yield to prevent the transmission of overload torque when said servo mechanism reaches the limit of its shifting movement.

9. In a cone type of friction clutch, the combination of cooperating clutch cones, one of which is shiftable, toggle strut servo mechanism for transmitting shifting movement to said shiftable clutch cone, yieldable means permitting yield in the pressure of engagement established between said clutch cones by said servo mechanism, and ball-cam mechanism for controlling said servo mechanism.

10. In a friction clutch, the combination of two cooperating clutch cones, one of which is shiftable, spring means for effecting initial engagement of the clutch, torque responsive toggle strut servo mechanism thereafter operative to transmit additional shifting force to said shiftable cone for securing high pressure engagement between said cones, stop means for limiting the actuation of said servo mechanism to a predetermined range of shifting movement, yieldable means for preventing the transmission of overload torque when said stop means has prevented further shifting movement by said servo mechanism, and control mechanism comprising a pair of cooperating cam rings having cam pockets therein, balls in said cam pockets operative to exert a spreading force between said cam rings to release the clutch upon relative rotation between said cam rings, and a releasable control member governing relative rotation between said cam rings, said stop means operating through one of said cam rings to limit the range of torque responsive shifting movement of said servo mechanism.

11. In a cone type of friction clutch, the combination of cooperating clutch cones, one of which is shiftable, spring means for effecting initial engagement of the clutch, toggle strut servo mechanism thereafter responsive to torque transmitted through the clutch for imparting additional clutch engaging pressure to said shiftable clutch cone, resilient means permitting yield in the pressure of engagement established between said clutch cones by said servo mechanism, and control mechanism controlling the operation of said servo mechanism, said control mechanism comprising a pair of adjacent cam rings mounted coaxially with said clutch cones and said servo mechanism, both of said cam rings being rotatable, one of said rings being shiftable and the other being non-shiftable, cooperating cam pockets formed in the opposing faces of said cam rings, balls in said cam pockets, said shiftable cam ring being arranged in motion transmitting relation to said shiftable clutch element, a stop shoulder rotating with said non-shiftable cam ring, and a releasable stop arm coacting with said stop shoulder.

12. In a clutch of the class described, the combination of cooperating clutch elements, one of which is shiftable, torque responsive servo mechanism for transmitting shifting movement to said shiftable clutch element to establish relatively high engaging pressures between said elements, said shiftable clutch element comprising a yieldable web portion through which said engaging pressure is made yielding, stop means for limiting the range of shifting movement of said servo mechanism, and removable shims between said servo mechanism and said stop means for adjusting the point at which said stop means becomes effective.

13. In a clutch of the class described, the combination of rotary driving and driven members, cooperating clutch elements for establishing a driving relation therebetween, torque responsive servo mechanism for transmitting engaging pressure to said clutch elements, yieldable means connected in series between said servo mechanism and one of said driving and driven members through which said engaging pressure is made yieldable, and means functioning independently of said yieldable means for positively restricting the effective range of movement of said servo mechanism whereby said yieldable means prevents said clutch elements from transmitting an overload torque between said rotary driving and driven members.

14. In a clutch of the class described, the combination of cooperating clutch elements, one of which is shiftable, said shiftable clutch element comprising a clutch surface, a hub structure, and yieldable means arranged between said clutch surface and said hub structure, torque responsive servo mechanism adapted to impart shifting movement to said hub structure for moving said shiftable clutch element into pressure engagement with the companion clutch element, said yieldable means permitting yield in the pressure of engagement between said clutch elements, and means for controlling the operation of said servo mechanism.

15. In a clutch of the class described, the combination of two cooperating clutch cones, one of which is shiftable, torque responsive servo mechanism for transmitting shifting movement to said shiftable clutch cone to establish relatively high engaging pressure between said cones, one of said cones comprising a sheet metal member having a yieldable web portion capable of lateral flexure permitting yield in the pressure of engagement established between said clutch cones by said servo mechanism, a plurality of cupped resilient washers adapted to be placed in positions where they increase the stiffness of said web portion to such lateral flexure, and control mechanism controlling the operation of said servo mechanism.

16. In a clutch, the combination of cooperating clutch elements, one of which is shiftable, ball-cam mechanism controlling shifting movement of said latter clutch element, said ball-cam mechanism comprising a pair of rotatable cam rings having inclined cam pockets therein and balls engaging in said pockets, and an adjustment ring arranged for screw threaded adjusting motion relatively to said shiftable clutch element and relatively to one of said cam rings for adjusting the axial spacing between said shiftable clutch element and said latter cam ring.

17. In a clutch of the class described, the combination of rotary driving and driven members, two cooperating clutch cones for establishing a driving relation therebetween, one of which is shiftable into and out of engagement with the other, torque responsive servo mechanism transmitting shifting movement to said shiftable clutch element for establishing relatively high engaging pressure between said clutch cones, resilient means operatively connected between one of said rotary members and one of said cones and through which said engaging pressure is made yielding, ball-cam mechanism for controlling the operation of said servo mechanism, said ball-cam mechanism comprising a pair of rotatable cam members having inclined cam pockets therein and balls engaging in said cam pockets, a stop shoulder rotating with one of said cam members, a releasable stop arm adapted to coact with said stop shoulder to interrupt the rotation of said latter cam member, an adjusting ring having screw threaded connection with the other of said cam members and adapted to engage with said shiftable clutch cone, said adjustable ring being adjustable to vary the relative axial positions of said shiftable clutch cone and said latter cam member, locking means for said adjustable ring comprising a locking lug engageable selectively with different recesses in said adjustable ring, and means for securing said lug selectively in different angular positions to said shiftable clutch element.

18. In a clutch, the combination of two cooperating clutch elements, one of which is shiftable, torque responsive servo mechanism for transmitting clutch engaging force to said shiftable clutch element, ball-cam mechanism for controlling the operation of said servo mechanism, said ball-cam mechanism comprising two cam rings having inclined cam pockets therein and balls engaging in said pockets, and a stop member separate from both cam rings and adapted to be engaged by one of said rings for limiting the motion of said servo mechanism.

19. In a clutch, the combination of cooperating clutch elements, one of which is shiftable, servo mechanism for transmitting shifting force to said shiftable clutch element, and overload release means enabling the other of said clutch elements to shift so as to prevent the transmission of overload torque through the clutch.

20. In a friction clutch, the combination of cooperating first and second friction clutch elements, torque responsive servo mechanism operative to transmit shifting force to said first clutch element in a clutch engaging direction with respect to said second clutch element, and means enabling said second clutch element to yield to such shifting force for preventing the transmission of overload torque through the clutch.

21. In a clutch of the class described, the combination of a rotary member, an outer clutch cone carried by said rotary member, an inner clutch cone shiftable into and out of engagement with said outer clutch cone, servo mechanism transmitting shifting movement to said inner clutch cone for establishing pressure engagement between said cones, and yieldable means yieldably connecting said outer clutch cone with said rotary member permitting yielding movement of said outer clutch cone under clutch engaging pressures created by said servo mechanism.

22. In a clutch, the combination of a rotary member, cooperating inner and outer clutch cones, torque responsive servo mechanism for transmitting shifting movement to said inner cone to effect high pressure engagement between said cones, ball-cam mechanism controlling the operation of said servo mechanism, and torque transmitting straps connecting said outer clutch cone with said rotary member for transmitting torque therebetween while permitting axial shifting movement of said outer clutch cone relatively to said rotary member in response to the pressure of engagement established between said cones.

23. In a clutch, the combination of a rotary member, a first clutch element adapted to rotate simultaneously therewith, a second clutch element shiftable into and out of clutching engagement with said first clutch element, and torque transmitting flexible straps operatively connecting said first clutch element with said rotary member for transmitting torque therebetween while permitting said first clutch element to have shifting movement relatively to said rotary member under the engaging pressure of said second clutch element.

24. In a punch press, a friction clutch for transmitting power to the crank shaft of the press comprising a pair of coacting clutch elements, servo mechanism carrying the entire torque load transmitted through said clutch to said crankshaft and responsive to said torque for causing high pressure engagement between said clutch elements under the impact torque of the press, and means for preventing said servo mechanism from creating engaging pressures between said clutch elements in excess of a substantially predetermined pressure capable of transmitting safe torque loads.

25. In a friction clutch for transmitting rotation from a rotary driving member to a rotary driven member, the combination of driving and driven friction clutch elements connected with said driving and driven members, one of said clutch elements being shiftable, torque responsive servo mechanism connected in series between said driven clutch element and said driven member and sustaining all torque transmitted through the clutch, said servo mechanism causing high pressure engagement between said clutch elements, and means for limiting the engaging pressure effective between said clutch elements to prevent the transmission of overload torque through said clutch.

26. In a friction clutch for transmitting rotation from a rotary driving member to a rotary driven member, the combination of driving and driven friction clutch elements connected with their respective rotary driving and driven members, one of said clutch elements being shiftable into and out of driving engagement with the other clutch element, control means for shifting said shiftable clutch element, torque responsive servo mechanism connected in series between one of said clutch elements and its respective rotary member, and sustaining substantially all torque transmitted through the clutch, said servo mechanism causing high pressure engagement between said clutch elements, and means for limiting the engaging pressure effective between said clutch elements to prevent the transmission of overload torque through said clutch.

CLARENCE M. EASON.